(12) United States Patent
Tomita

(10) Patent No.: US 6,980,494 B1
(45) Date of Patent: Dec. 27, 2005

(54) OPTICAL DISC RECORDING METHOD AND APPARATUS, OPTICAL DISC, AND OPTICAL DISC REPRODUCING APPARATUS

(75) Inventor: Yoshimi Tomita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 591 days.

(21) Appl. No.: 09/584,783

(22) Filed: Jun. 1, 2000

(30) Foreign Application Priority Data

Jun. 2, 1999 (JP) ................................. 11-154471

(51) Int. Cl.[7] .............................................. G11B 7/00
(52) U.S. Cl. ................................. 369/44.13; 369/47.28
(58) Field of Search ..................... 369/112.01, 44.13, 369/53.21, 47.19, 111, 275.3, 47.28, 59.2, 369/275.4, 44.31

(56) References Cited

U.S. PATENT DOCUMENTS 6,097,695 A * 8/2000 Kobayashi ............... 369/275.4

FOREIGN PATENT DOCUMENTS

| EP | 0 786 767 A2 | 7/1997 |
|----|--------------|---------|
| EP | 0 886 275 A1 | 12/1998 |
| EP | 0 969 452 A1 | 1/2000 |
| JP | 10-320737 | 12/1998 |
| JP | 10-320773 | 12/1998 |
| JP | 10-320774 | 12/1998 |

* cited by examiner

*Primary Examiner*—Paul W. Huber
(74) *Attorney, Agent, or Firm*—Morgan Lewis & Bockius LLP

(57) ABSTRACT

An optical disc recording method, an optical disc recording apparatus, and an optical disc in which performances of the optical disc is maintained over a long period of time without generating abrupt changes in wobbling curve of grooves of the optical disc. A phase modulation signal S4 is generated with abrupt changes in the waveform thereof at a phase transition point p being removed in accordance with a channel bit signal S3 including address signal, and the groove is made wobble in accordance with said phase modulation signal S4.

20 Claims, 13 Drawing Sheets

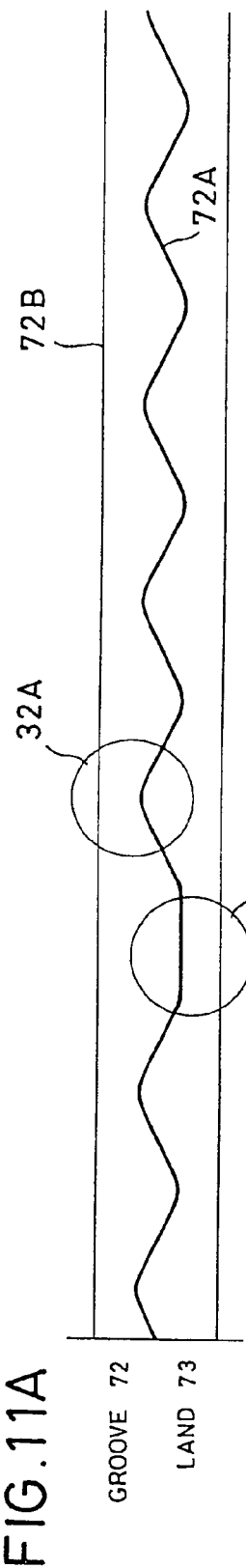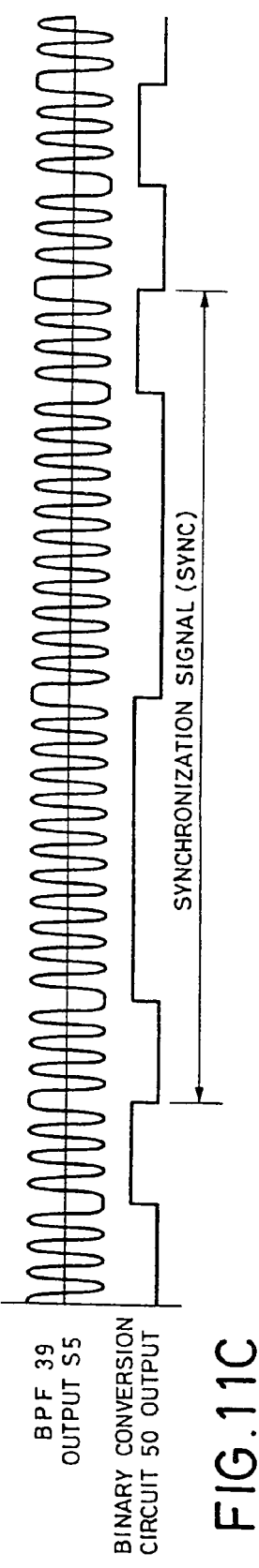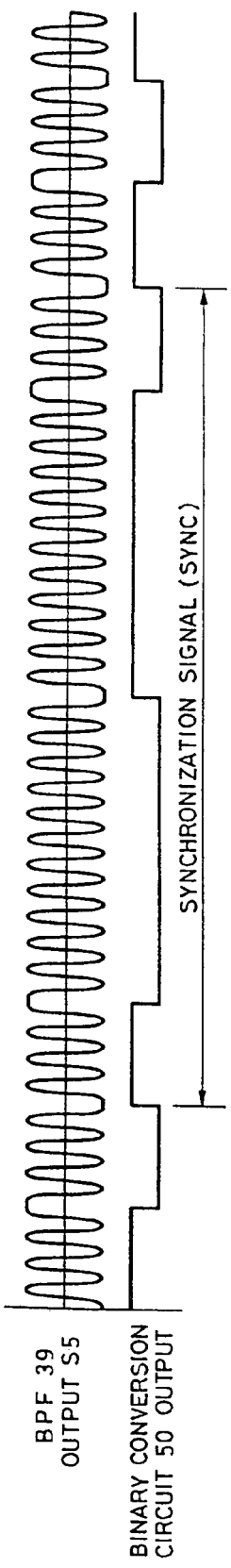

OPTICAL DISC RECORDING METHOD AND APPARATUS, OPTICAL DISC, AND OPTICAL DISC REPRODUCING APPARATUS

BACKGROUND OF THE INVENTION

1. Field of the Invention

The present invention relates to an optical disc recording method, an optical disc recording apparatus and an optical disc, and particularly to an optical disc recording method, an optical disc recording apparatus and an optical disc for pre-formatting of optical disc with serial data including at least address data by means of a groove.

2. Description of Related Art

Optical discs for data recording such as CD-R, DVD-R and DVD-RW store address information recorded thereon in advance by various methods, for locating recording positions. In a CD-R disc, for example, a groove is made wobble in accordance with a signal obtained by frequency modulation of the address information. However, when the groove is formed wobbling in accordance with the frequency modulated signal, playback operation is sensitive to the deterioration of C/N ratio and the recorded address information is difficult to read reliably.

In order to avert this problem, such an optical disc mastering apparatus has been developed that makes the groove wobble in accordance with a signal obtained by phase modulation of the address signal.

However, on a disc generated by such an optical disc mastering apparatus, pointed portions are produced in the grooves formed on the disc. As a result, in the case of a phase-transition type optical disc whereon data are recorded by changing local crystal structure of the recording layer, there has been such a problem that deterioration of the recording layer originates at the pointed portions in the recording layer and spread therefrom, thus degrading the disc performance gradually.

SUMMARY OF THE INVENTION

The present invention provides an optical disc recording method, an optical disc recording apparatus and an optical disc to solve the problems described above. An optical disc recording method according to a first aspect of the present invention is a method of pre-formatting the optical disc by forming a wobbling groove on the optical disc according to a phase modulation signal obtained by phase modulation of serial data which includes address information, wherein such a phase modulation signal is generated as abrupt changes in the waveform thereof at phase transition points are removed according to the serial data, thereby forming the wobbling groove in accordance with the phase modulation signal.

An optical disc recording apparatus according to another aspect of the present invention is an optical disc recording apparatus which pre-formats an optical disc by forming a wobbling groove on the optical disc according to serial data which includes address information, and is provided with a phase modulation circuit which generates a phase modulation signal of the serial data wherein abrupt changes in the waveform thereof at the phase transition points are removed according to the serial data, and means for causing the groove to wobble according to the phase modulation signal.

According to the optical disc recording method or the recording apparatus, since the smoothly wobbling groove is formed on the optical disc, stable performance of the optical disc can be maintained over an extended period of time.

Further, since the groove wobbles in accordance with the phase modulation signal, operation of the apparatus has immunity to deterioration of the C/N ratio and recorded address information can be read out reliably.

An optical disc according to sill another aspect of the present invention is an optical disc which has serial data including address information pre-formatted thereon by means of a wobbling groove. The groove is formed to wobble in accordance with the phase modulation signal of the serial data wherein abrupt changes in the waveform at the phase transition points have been removed.

Consequently, the groove wobbles smoothly, and stable performance of the optical disc can be maintained over an extended period of time. Further, since the groove wobbles in accordance with the phase modulation signal, operation of the apparatus is hardly affected by deterioration of the C/N ratio and recorded address information can be read out reliably.

Further, in addition to the solution of the problems described above, the present invention provides an optical disc recording method, an optical disc recording apparatus, an optical disc and an optical disc reproduction apparatus that are capable of determining, from groove reproduction signal, which of groove and land is being reproduced.

An optical disc recording method, according to still further aspect of the present invention which solves the problem described above, comprises pre-formatting an optical disc by forming a wall surface on one side of a groove on the optical disc in wobbling configuration according to serial data which includes address information, while adding a synchronization signal having a predetermined bit pattern to the serial data for discriminating land and groove. The wall surfaces on one side of the grooves are caused to wobble according to phase modulation signal, by removing abrupt changes in the waveform at the phase transition points thereby applying phase modulation to the serial data including the synchronization signal.

An optical disc recording apparatus according to still another aspect of the present invention is an optical disc recording apparatus which pre-formats an optical disc by forming wall surface on one side of a groove on the optical disc in wobbling configuration according to the serial data which includes the address information, and comprises a synthesizer circuit which synthesizes the synchronization signal, which has a predetermined bit pattern for discriminating land and groove, with the serial data, a phase modulation circuit which modulates the output of the synthesizer circuit into the phase modulation signal that has abrupt changes in the waveform thereof at the phase transition points being removed, and means for causing the wall surfaces on one side of the grooves to wobble according to the phase modulation signal.

According to the optical disc recording method and the recording apparatus described above, the smoothly wobbling groove including the synchronization signal is formed on the wall surface on one side of the groove of the optical disc. This makes it possible to maintain stable performance of the optical disc over a long period of time. Also because the groove is caused to wobble in accordance with the phase modulation signal, the optical disc thus manufactured has high immunity to deterioration in C/N ratio and allows it to reliably read the address information which has been recorded. Further as the groove reproduction signal corresponding to the synchronization signal has a state inverted from that of land reproduction signal, detecting this signal state allows it to know which one of land and groove is being reproduced.

An optical disc according to still another aspect of the present invention has a groove of which wall surface on one side thereof wobbles according to serial data which includes address information, while the serial data includes synchronization signal having a predetermined bit pattern for discriminating land and groove. The groove wobbles in accordance with phase modulation signal obtained by applying phase modulation to the serial data which includes the synchronization signal so that abrupt changes in the waveform thereof at the phase transition points are removed.

As a result, the wall surface on one side of the groove which includes the synchronization signal is formed to smoothly wobble, and stable performance of the optical disc is maintained over a long period of time. Also because the groove wobbles in accordance with the phase modulation signal, the disc has high immunity to deterioration in the C/N ratio and allows it to reliably read the address information which has been recorded. Furthermore, as the groove reproduction signal corresponding to the synchronization signal has a state inverted from that of the land reproduction signal, detecting this signal state allows it to know which of land and groove is being reproduced.

An optical disc reproduction apparatus according to still another aspect of the present invention is an optical disc reproduction apparatus which reproduces information recorded on an optical disc by applying phase modulation to serial data, which includes synchronization signal having a predetermined bit pattern for discriminating land and groove, and address information, into phase modulation signal which has abrupt changes in the waveform thereof at the phase transition points being removed so that wall surface on one side of a groove wobbles in accordance with the phase modulation signal, and comprises a phase demodulation circuit which applies phase demodulation to the groove reproduction signal extracted from reproduction signal of an optical head, and a land/groove discrimination circuit which determines which of land and groove is being reproduced by the optical head, by checking the pattern of the synchronization signal included in the output of the phase demodulation circuit.

The land/groove discrimination circuit checks the pattern of the synchronization signal included in the output of the phase demodulation circuit and determines which, land or groove, is being reproduced, thereby to control the polarity inversion of a polarity inversion circuit. Thus, a laser beam does not come off the track even in such a situation as the groove is reproduced from the land or the land is reproduced from the groove, so that data recorded on the land and the groove can be followed and reproduced.

BRIEF DESCRIPTION OF THE DRAWINGS

These and other objects and advantages of the present invention will become clear from the following description with reference to the accompanying drawings, wherein:

FIG. 11A through FIG. 11C are signal waveform diagrams for explaining the optical disc recording/reproduction apparatus shown in FIG. 10;

DETAILED DESCRIPTION OF THE PREFERRED EMBODIMENTS

Prior to detailed description of the preferred embodiments, an optical disc mastering apparatus of the prior art will be described below with reference to the accompanying drawing.

Figure 1:
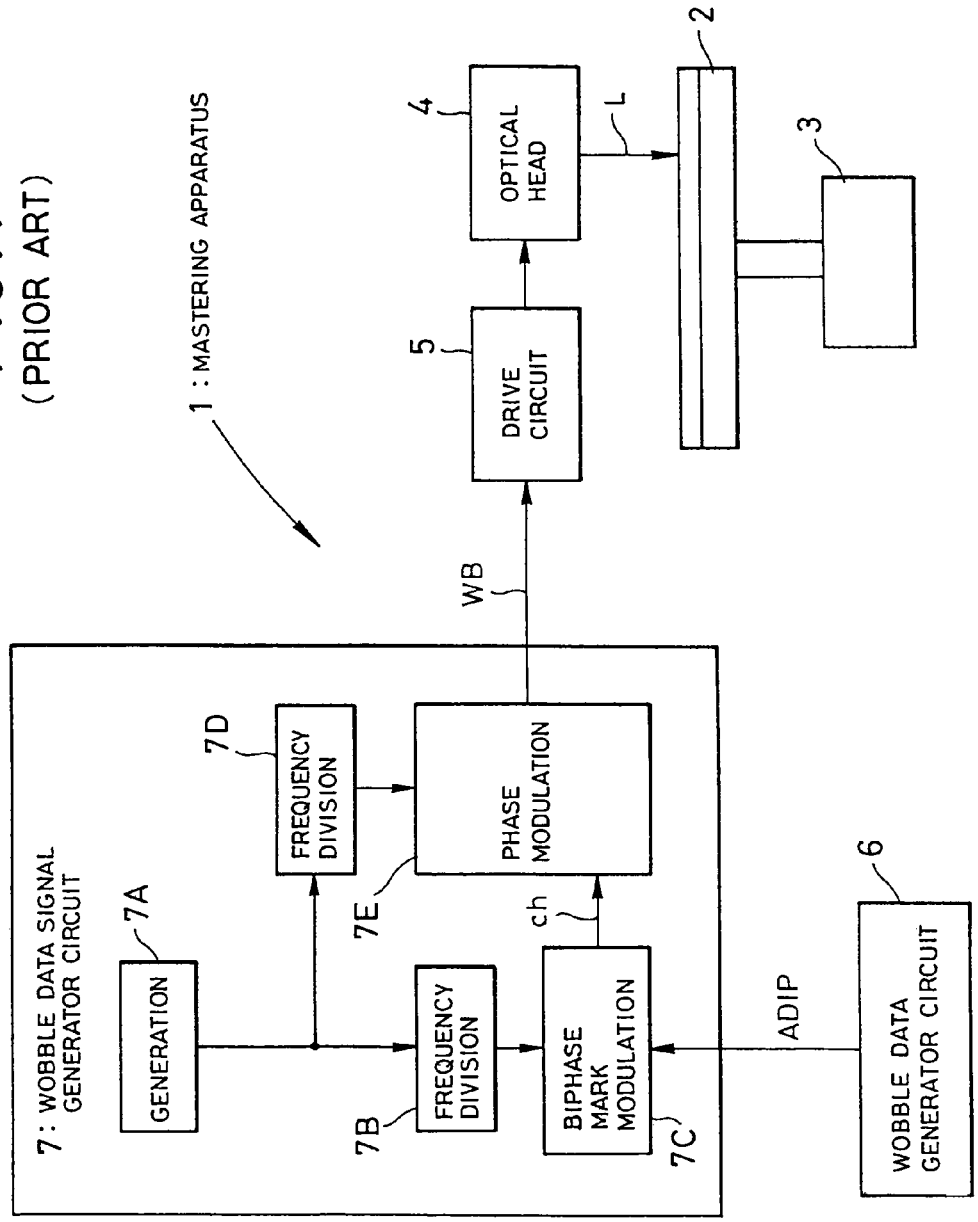
FIG. 1 is a block circuit diagram showing an optical disc mastering apparatus 1 of the prior art.

Japanese Patent Kokai No. Hei. 10-320737 discloses an optical disc mastering apparatus which causes a groove to wobble in accordance with a signal obtained by phase modulation of address information. FIG. 1 is a block diagram of the optical disc mastering apparatus 1 described in this publication.

A wobble data generator circuit 6 generates wobble data (ADIP) which includes address information and outputs it to a wobble data signal generator circuit 7. The wobble data signal generator circuit 7 comprises a master clock generator circuit 7A, frequency dividing circuits 7B, 7D, a biphase mark modulation circuit 7C and a phase modulation circuit 7E. In the wobble data signal generator circuit 7, biphase mark modulation is applied to the wobble data (ADIP) which has been input thereby to generate a channel signal (ch) by the biphase mark modulation circuit 7C, with the channel signal (ch) being further phase-modulated by the phase modulation circuit 7E thereby to output a wobble signal (WB). The wobble signal (WB) output is fed via a drive circuit 5 to an optical head 4. The optical head 4 moves a laser beam L in the radial direction of a disc according to the output level of the wobble signal (WB), thereby to expose the portion to light and form a wobbling groove on a master optical disc 2.

In the optical disc mastering apparatus 1, because the groove wobbles in accordance with the phase modulation signal, the optical disc thus manufactured has high immunity to deterioration in the C/N ratio and allows it to reliably read the address information which has been recorded thereon.

Figure 2:
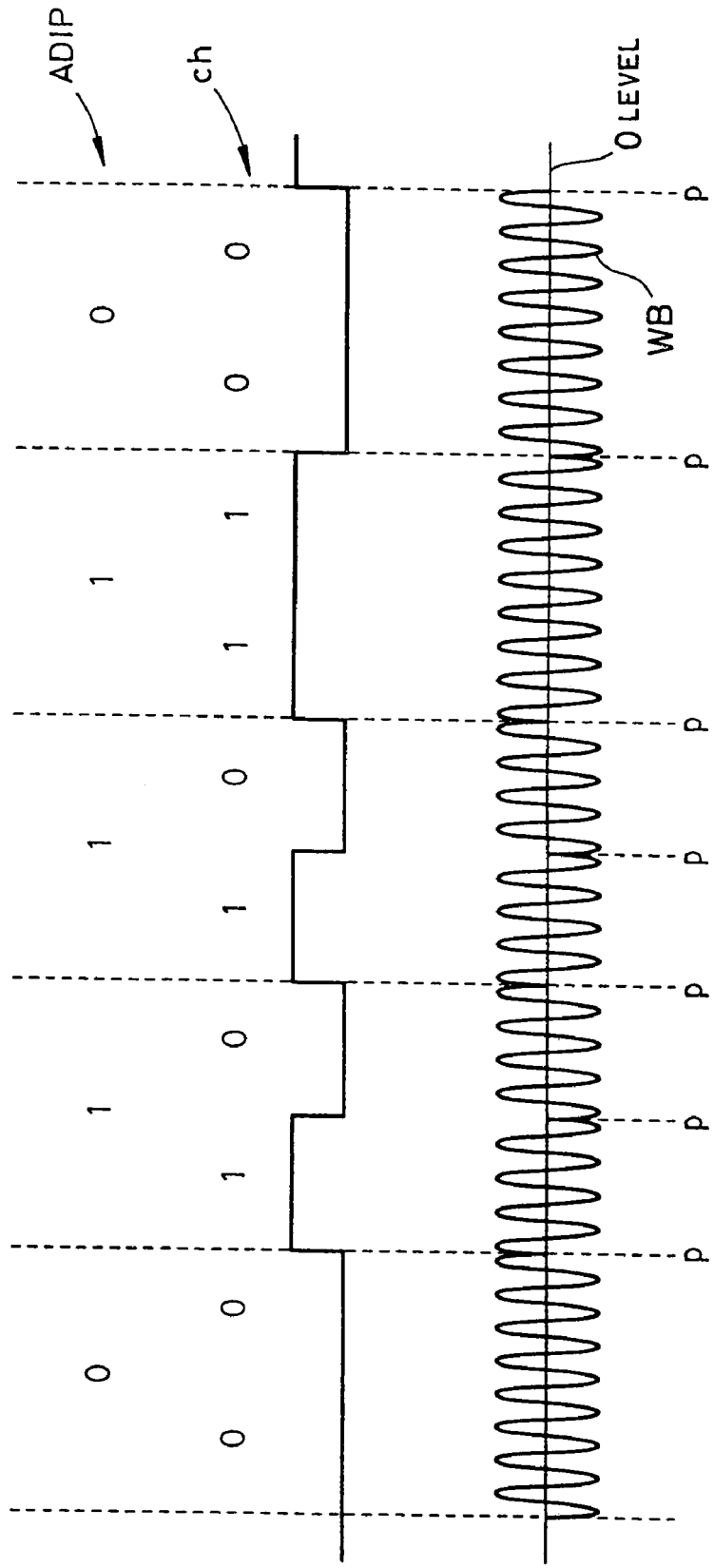
FIG. 2 is a signal waveform diagram of the optical disc mastering apparatus 1 of the prior art shown in FIG. 1.

However, in the optical disc mastering apparatus 1 described above, since the wobble signal (WB) is a signal which has been obtained simply by phase modulation of the channel signal (ch) as shown in FIG. 2, the signal waveform thereof is abruptly inverted at a phase transition point p where the channel signal (ch) changes from "0" to "1" or from "1" to "0" thus naturally resulting in an abrupt change (pointed portion) in the wobbling curve of the groove on the disc at the corresponding position. In the case of a phase-transition type optical disc such as CD-RW and DVD-RW whereon data are recorded by changing the local crystal structure of the recording layer, as described previously, there is such a drawback that deterioration of the recording layer originates at the pointed portions and spread therefrom, thus degrading the disc performance gradually when the groove is caused to wobble simply in accordance with the phase modulation signal.

Figure 3:
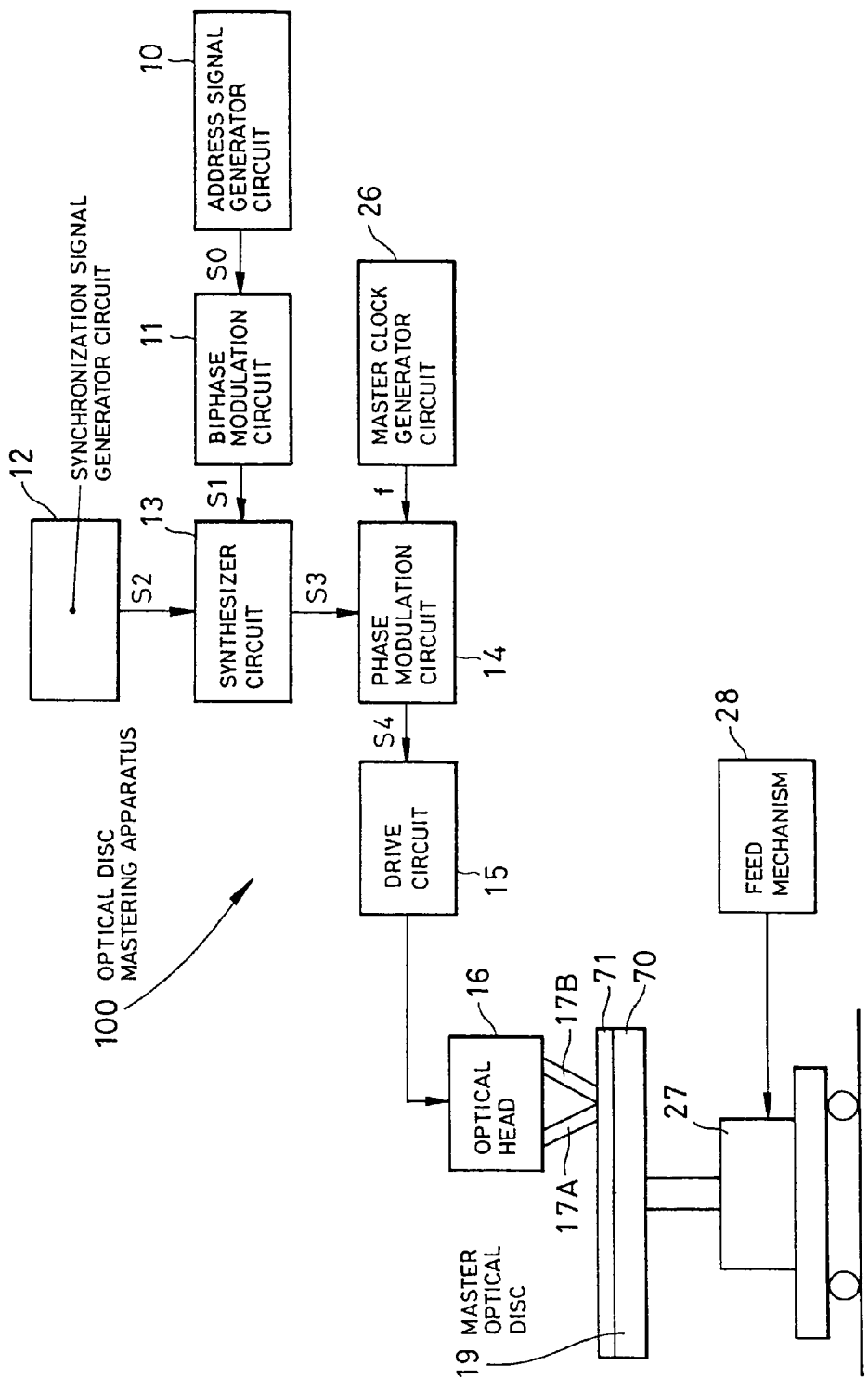
FIG. 3 is a block circuit diagram of a master optical disc recording apparatus 100 which is an application of the present invention.
Figure 4:
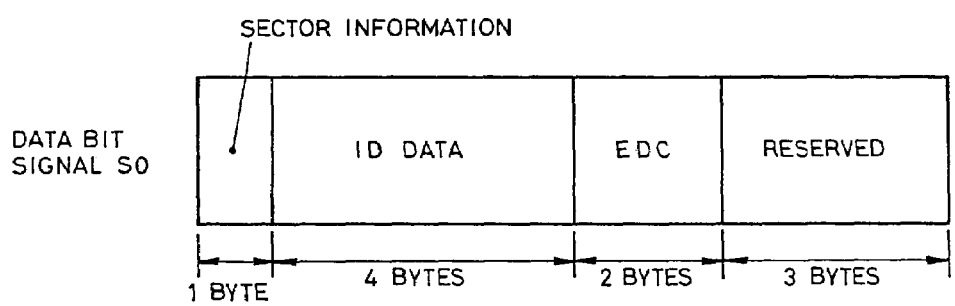
FIG. 4 is a drawing which shows an example of the format of a data bit signal which is output from an address signal generator circuit 10.

Hereinafter, one embodiment of the present invention will be described with reference to the accompanying drawings. FIG. 3 shows an embodiment of the optical disc recording apparatus according to the present invention, wherein a master optical disc recording apparatus 100 which makes a master optical disc 19 which is used in manufacturing single spiral land/groove recording discs (hereinafter called single spiral disc) whereon lands and grooves are connected alternately to each other for every predetermined angle (for every full circle in this embodiment) with data recorded on both the lands and the grooves, in order to obtain a large storage capacity.

An address signal generator circuit 10 generates a 76-bit data bit signal S0 which includes address information and outputs it to a biphase modulation circuit 11. According to this embodiment, the data bit signal S0 has a format shown in FIG. 2 comprising 1 byte of sector information, 4 bytes of address data (ID data), 2 bytes of error detection code (EDC) and 3 bytes of reserved area. The data bit signal S0 is not limited to this format, and may have any format as long as the address information such as time and frame information is included.

The biphase modulation circuit 11 applies biphase modulation to every bit (turning "1" to "01" and "0" to "10" of the data bit signal S0 in order to discriminate a synchronization signal S2 to be added to the head later and the data bit signal S0. Because of the biphase modulation, output (biphase signal S1) of the biphase modulation circuit 11 never has such a bit pattern as three or more consecutive bits are all "1" or "0".

Figure 5:
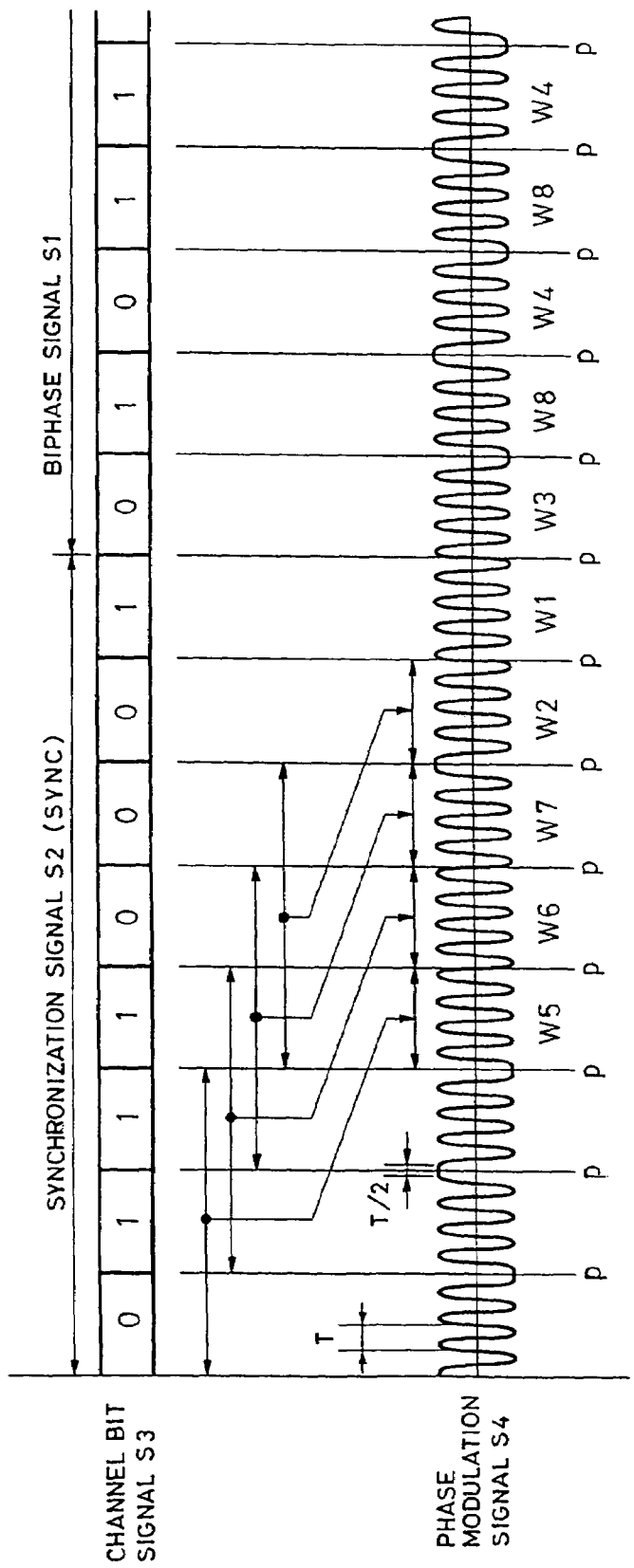
FIG. 5 is a signal waveform diagram for explaining the master optical disc recording apparatus 100 shown in FIG. 3.

A synchronization signal generator circuit 12 generates the synchronization signal S2 which includes such a bit pattern which does not exist in the biphase signal S1 as three or more consecutive bits are all "1" or "0". Further in the apparatus of this embodiment, in order to make it possible to determine which of the land and the groove is being reproduced by the laser beam, the synchronization signal generator circuit 12 generates the synchronization signal S2 comprising a bit pattern "01110001" which allows it to detect the phase thereof. A signal synthesizer circuit 13 receives the biphase signal S1 and the synchronization signal S2 as inputs and outputs a channel bit signal S3 (serial data) comprising the synchronization signal S2 added to the start of the biphase signal S1 (refer to FIG. 5).

The phase modulation circuit 14 constitutes the most characteristic part of the present invention. The phase modulation circuit 14 receives the channel bit signal S3 and a master clock f which is output from a master clock generator circuit 26 as inputs, and outputs phase modulation signal S4 of the channel bit signal S3 wherein abrupt changes in the waveform thereof at the phase transition points are removed (refer to FIG. 5). According to the apparatus of this embodiment, in particular, output level of the phase modulation signal S4 is maintained substantially constant during a predetermined length of time including the phase transition point p at the center thereof, that is an interval T/2 (T is the basic period) in this embodiment. The basic period T of the phase modulation signal S4 is set so that the frequency (1/T) is higher than the frequency band of the tracking servo signal and lower than the frequency band of the data recorded on and reproduced from the optical disc, so as not to cause adverse effect to the recorded/reproduced data and the tracking servo system.

Figure 8:
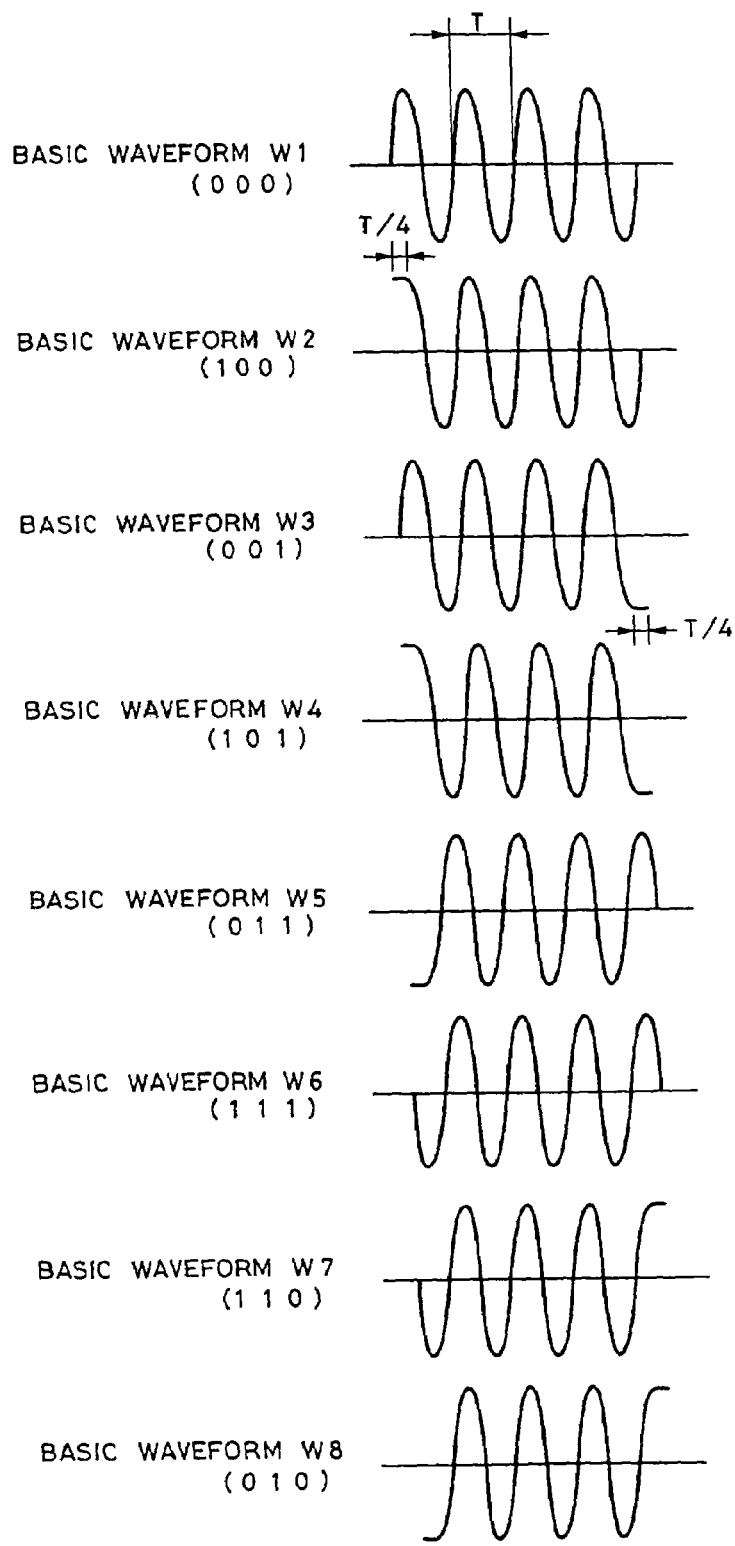
FIG. 8 is a waveform diagram showing basic waveforms W1 through W8 of a phase modulation signal S4 recorded on a memory 23.

The phase modulation signal S4 comprises a combination of eight kinds of basic waveforms W1 through W8 which correspond to three consecutive bits of the channel bit signal S3 as shown in FIG. 8.

Basic waveform W1 which corresponds to 3-bit data "000" consists of four cycles of sinusoidal wave having period of T. Basic waveform W2 which corresponds to 3-bit data "100" has such a waveform as the output is kept at the maximum positive level during the first interval of T/4 of the basic waveform W1. Basic waveform W3 which corresponds to 3-bit data "001" has such a waveform as the output is kept at the maximum negative level during the last interval of T/4 of the basic waveform W1. Basic waveform W4 which corresponds to 3-bit data "101" has such a waveform as the output is kept at the maximum positive level and the maximum negative level during the first and the last intervals of T/4, respectively, of the basic waveform W1.

Basic waveform W5 which corresponds to 3-bit data "011" has such a waveform which is the inversion of the basic waveform W1 and the output thereof is held at the maximum negative level during the first interval T/4. Basic waveform W6 which corresponds to 3-bit data "111" has a waveform which is the inversion of the basic waveform W1. Basic waveform W7 which corresponds to 3-bit data "110" has such a waveform which is the inversion of the basic waveform W1 and the output thereof is held at the maximum positive level during the last interval T/4. Basic waveform W8 which corresponds to 3-bit data "010" has such a waveform which is the inversion of the basic waveform W1 and the output thereof is held at the maximum negative level and the maximum positive level during the first and the last intervals of T/4, respectively.

Figure 6:
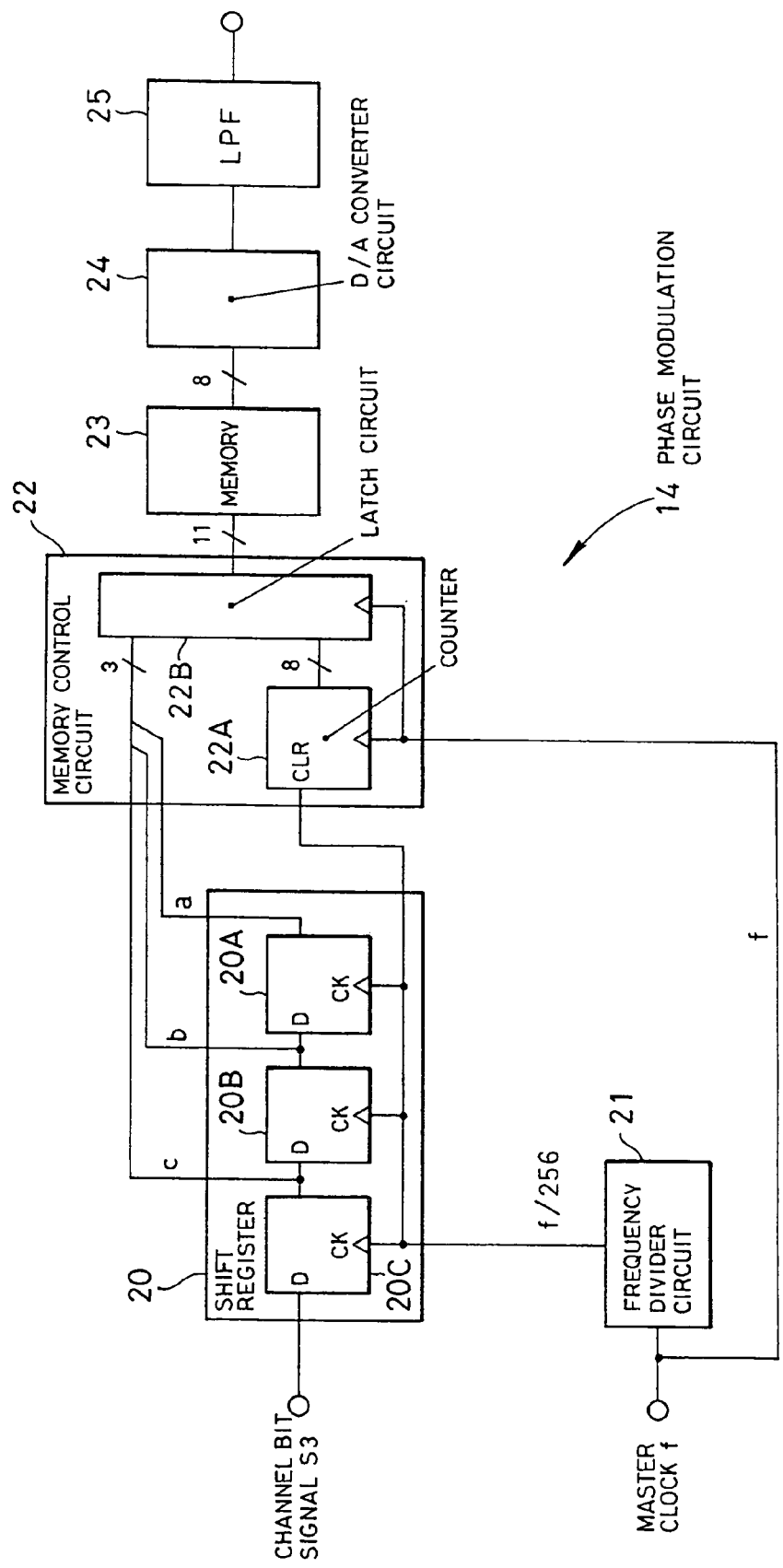
FIG. 6 is a block circuit diagram showing an embodiment of a phase modulation circuit 14.

FIG. 6 shows an example of the phase modulation circuit 14 which generates the basic waveforms W1 through W8. The frequency dividing circuit 21 divides the master clock f which is output from the master clock generator circuit 26 and outputs a frequency division clock f/256. A shift register 20 consists of three D-type flip-flop circuits 20A through 20C, and converts the channel bit signal S3 which is serial data output from the synthesizer circuit 13 into 3-bit parallel data according to the frequency division clock f/256 and outputs the parallel data to a memory control circuit 22.

Figure 7:
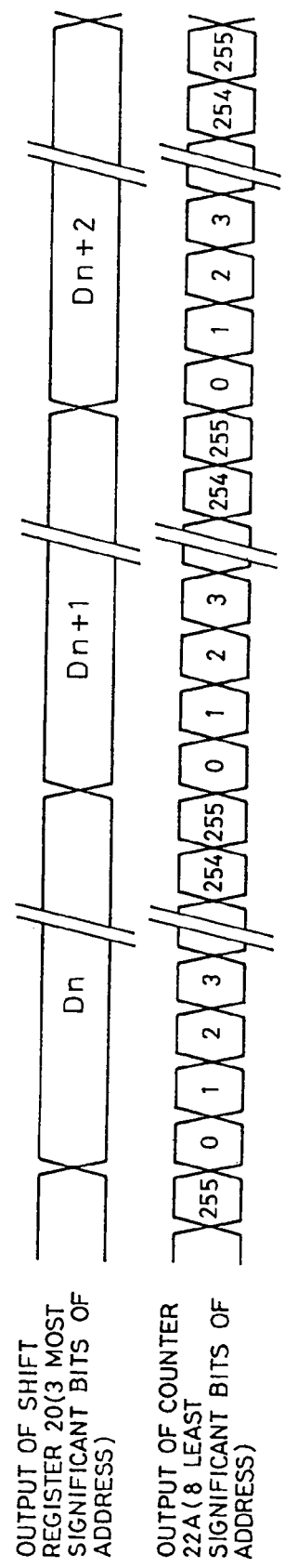
FIG. 7 is a timing chart for explaining a memory control circuit 22.

The memory control circuit 22 has an 8-bit counter 22A and a latch circuit 22B incorporated therein. The counter 22A counts the pulses of the master clock f, while being reset to zero with the changing timing of the output of the shift register 20 (3-bit parallel data Dn) as shown in FIG. 7. Since the counter counts the frequency-division clock f/256, the output thereof is 3-bit parallel data each representing from 0 to 255.

The latch circuit 22B latches the 3-bit output of the shift register 20 and the 8-bit output of the counter 22A, according to the master clock f, and outputs the 3-bit output of the shift register 20 to the address terminals of memory 23 which correspond to the three most significant bits and the 8-bit output of the counter 22A to the address terminals of memory 23 which correspond to the least significant eight bits.

The memory 23 stores 8-bit sampling data of the eight basic waveforms W1 through W8 sampled at 256 points in eight segments of the address area divided in correspondence to the most significant 3 bits. That is, sampling data of the basic waveform W1 is stored in address area 1 "0000 . . . 0"~"0001 . . . 1", sampling data of the basic waveform W2 is stored in address area 2 "0010 . . . 0"~ "0011 . . . 1", sampling data of the basic waveform W3 is stored in address area 3 "0100 . . . 0" ~"0101 . . . 1", sampling data of the basic waveform W4 is stored in address area 4 "0110 . . . 0"~"0111 . . . 1", sampling data of the basic waveform W5 is stored in address area 5 "1000 . . . 0"~"1001 . . . 1", sampling data of the basic waveform W6 is stored in address area 6 "1010 . . . 0"~"1011 . . . 1", sampling data of the basic waveform W7 is stored in address area 7 "1100 . . . 0"~"1101 . . . 1", and sampling data of the basic waveform W8 is stored in address area 8 "1110 . . . 0"~"1111 . . . 1".

Accordingly, the memory 23 outputs the sampling data of the basic waveform corresponding to the consecutive 3-bit parallel data Dn of the channel bit signal S3 in synchronization with the counting up of the counter 22A.

The sampling data of the basic waveform which is read from the memory 23 is sequentially converted by a D/A converter circuit 24 into analog signal of which unwanted high frequency components are cut off by a low-pass filter (LPF) 25 thereby generating the phase modulation signal S4.

The phase modulation signal S4 is fed, as a wobble signal used for wobbling the grooves, via a drive circuit 15 to an optical head 16 that constitutes means for wobbling the grooves.

Figure 9:
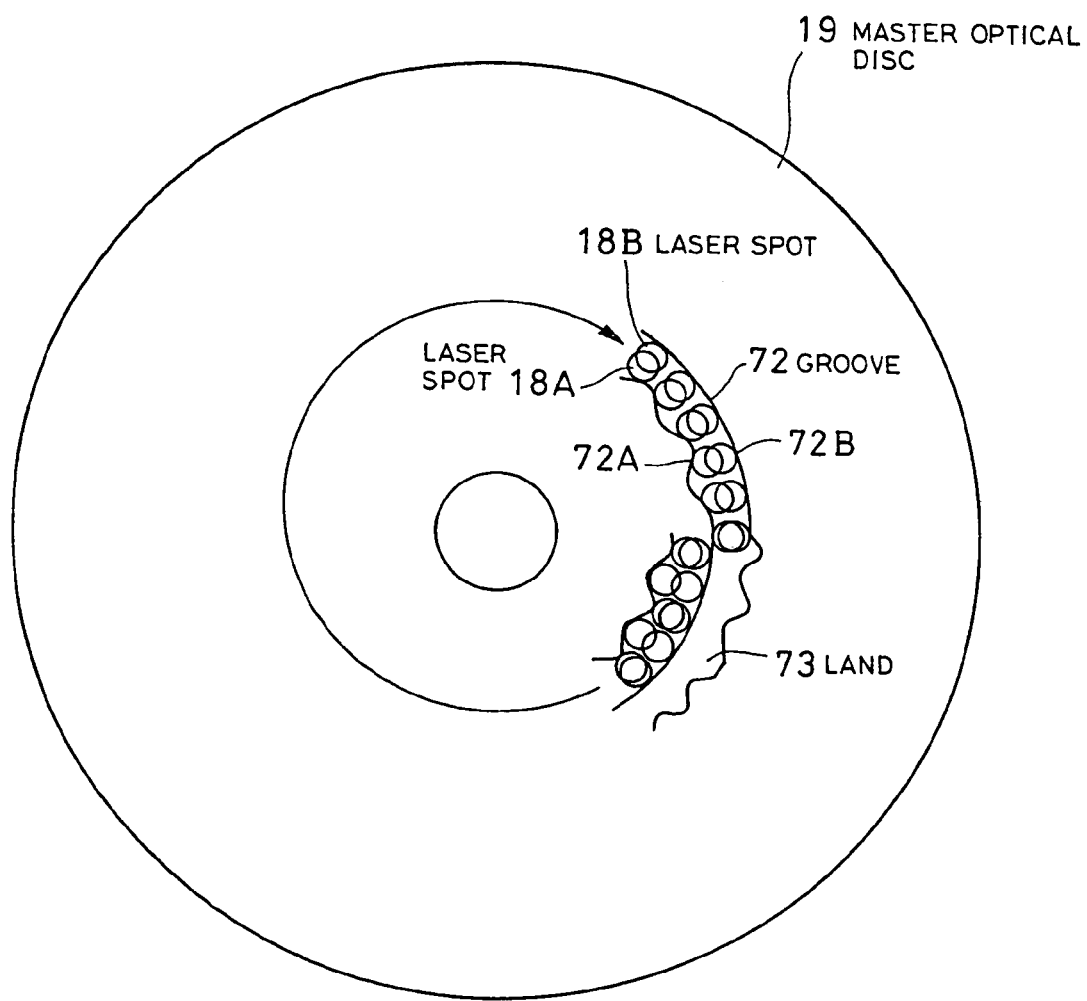
FIG. 9 is a schematic view which shows the positional relationship between a master optical disc 19 and laser spots 17A, 17B.

In the apparatus of this embodiment, in order to know which of the land 73 and the groove 72 of the single spiral disc is being traced by the laser beam during recording or reproduction of data, such a wobbling groove 72 must be formed as the wall surface only on the side nearer to the center of the disc wobbles as shown in FIG. 9. For this reason, the optical head 16 emits first and second laser beams 17A, 17B onto the disc surface so that light spots 18A, 18B always overlap, while causing only the first laser beam 17A to move in the radial direction of the disc according to the phase modulation signal S4 described above. As the means for polarizing the laser beam, a piezoelectric element, a rotating mirror, an optical polarizer or the like is used.

The master optical disc 19 is driven by a spindle motor 27 to rotate at a predetermined speed, and is moved by a feed mechanism 28 in a horizontal direction at a very low speed with a high accuracy, to change the radial positions of the light spots 18A, 18B over the disc. The master optical disc 19 is coated on the top surface of the glass substrate 70 thereof with a photosensitive material (photoresist) 71.

As a result, when the laser beam 17A is moved according to the wobble signal S4, the photosensitive film 22 on the master optical disc 19 is exposed to light only on the portion where the wobbling grooves of spiral configuration are to be formed. This exposure is carried out intermittently for every revolution of the disc in order to form the single spiral disc.

The master optical disc 19 exposed to light as described above is subject to a mastering process similar to that of the prior art, including development with an specified developer solution to dissolve the exposed portion (corresponding to the groove), thereby to form a stamper, and phase transition optical discs are mass-produced based on the stamper. This process is well known and therefore detailed description thereof will be omitted.

Figure 10:
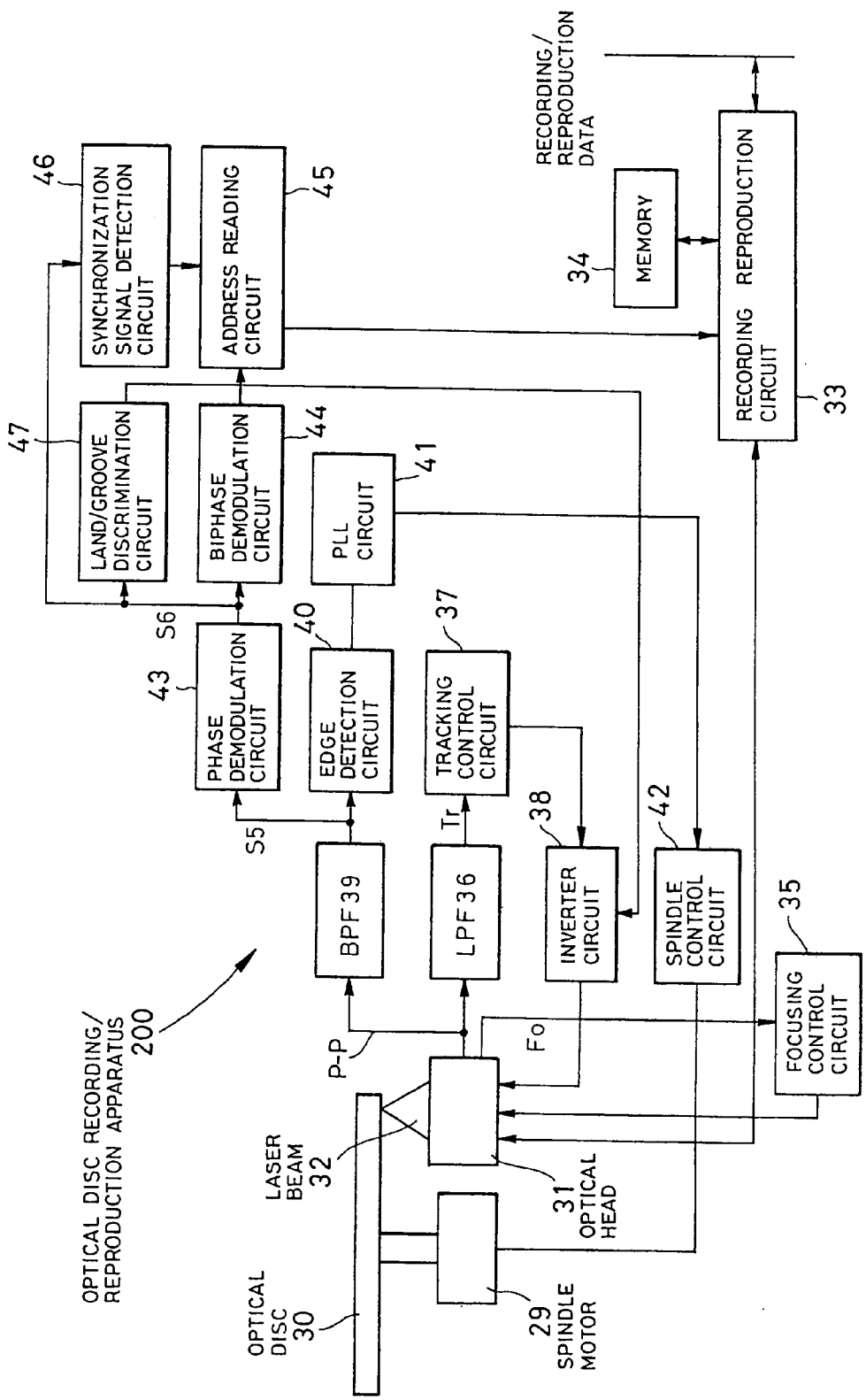
FIG. 10 is a block circuit diagram of an optical disc reproduction apparatus for recording data on and reading data from an optical disc manufactured with the master optical disc recording apparatus 100 shown in FIG. 3.

Now an optical disc recording/reproduction apparatus 200 that records on and reproduces from the phase transition optical discs, that has been mass-produced, various data including computer data, audio information and visual information will be described below by taking reference to FIG. 10. The optical disc recording/reproduction apparatus 200 is designed to record data on and reproduce data from the phase transition optical disc 30 which has single spiral configuration.

The optical disc 30 is driven by the spindle motor 29 to rotate. The optical head 31 emits a laser beam 32 onto the optical disc 30 and increases the power of the laser beam 32 when recording, thereby recording data by changing the crystal structure of the recording layer of the optical disc 30 locally. When reproducing the data recorded on the optical disc 30, power of the laser beam 32 is decreased.

A recording/reproduction circuit 33 carries out various signal processing operations such as adding an error correction signal, interleaving and modulation on the recording data supplied from an external apparatus (not shown) in cooperation with the memory 34, and outputs the signal to the optical head 31. The recording/reproduction circuit 33 also carries out various signal processing operations such as error correction, de-interleaving and demodulation on the reproduced signal which is read from the optical disc 30 by the optical head 31, and outputs the signal as reproduced data to the outside of the apparatus.

The optical head 31 outputs a focus error signal (Fo) which indicates the focusing condition of the laser beam 32, and a push-pull signal (P—P) which indicates the tracking condition in the form of difference between two parts of the reproduction signal divided in the tracking direction. A focus control circuit 35, upon input of the focus error signal, controls the focusing of the laser beam 32. The push-pull signal (P—P) is used for extracting a tracking error signal (Tr) by means of a low pass filter (LPF) 36 to allow a tracking control circuit 37 to control the tracking condition of the laser beam 32 according to the tracking error signal. Output of the tracking control circuit 37 is fed via the polarity inversion circuit 38 to the optical head 31 in order to make possible to invert the servo signal polarity thereof.

The push-pull signal (P—P) which is output from the optical head 31 is used by a band pass filter (BPF) circuit 39 to extract the groove reproduction signal (phase modulation signal). An edge detection circuit 40 detects the edge of the groove reproduction signal, and the PLL circuit 41 compares the phase between the output signal of the edge detection circuit 40 and the internal master clock. A spindle control circuit 42 controls the spindle motor 31 so that the disc 30 rotates always at the predetermined speed according to the output of the PLL circuit.

The groove reproduction signal which is output from the band pass filter circuit 39 is input to the phase demodulation circuit 43, and is demodulated into a channel bit signal S6. A biphase demodulation circuit 44 demodulates the channel bit signal S6 into data bit signal which includes the synchronization signal. A synchronization signal detection circuit 46 detects the synchronization signal included in the channel bit signal which is output from the phase demodulation circuit 43, and outputs synchronization signal position information to an address reading circuit 45. The address reading circuit 45 reads the 8-bit sector information and the 32-bit address data (ID data), which have been described previously, from the data bit signal of the biphase demodulation circuit 44 and feeds the data to the recording/reproduction circuit 33, according to the synchronization signal position information.

In the apparatus of this embodiment, in order to reproduce data recorded on the single spiral disc 30 whereon the lands and the grooves are connected alternately to each other, condition of tracing of the laser beam 32 over the land 73 is monitored thereby carrying out polarity inversion control of the tracking servo signal.

In order to achieve the object described above, the channel bit signal S6 output from the phase demodulation circuit 43 is further fed to the land/groove detection circuit 47. As described above, wall surface 72A only on the disc center side of the grove 72 formed on the optical disc 30 wobbles. As a result, as shown in FIG. 11A through FIG. 1C, when the laser beam 32 (beam spot 32A) traces the groove 72, output S5 of the band pass filter circuit 39 has the same phase as the phase modulation signal S4 during fabrication of the master disc, but when the laser beam 32 traces the land 73, the output S5 of the band pass filter circuit 39 becomes the inversion of the phase modulation signal S4 during fabrication of the master disc. Therefore, it is made possible to determine whether the laser beam 32 is tracing the groove 72 or the land 73, by demodulating the phase modulation signal S4 and checking the pattern of the synchronization signal included in the demodulated signal.

Figure 12:
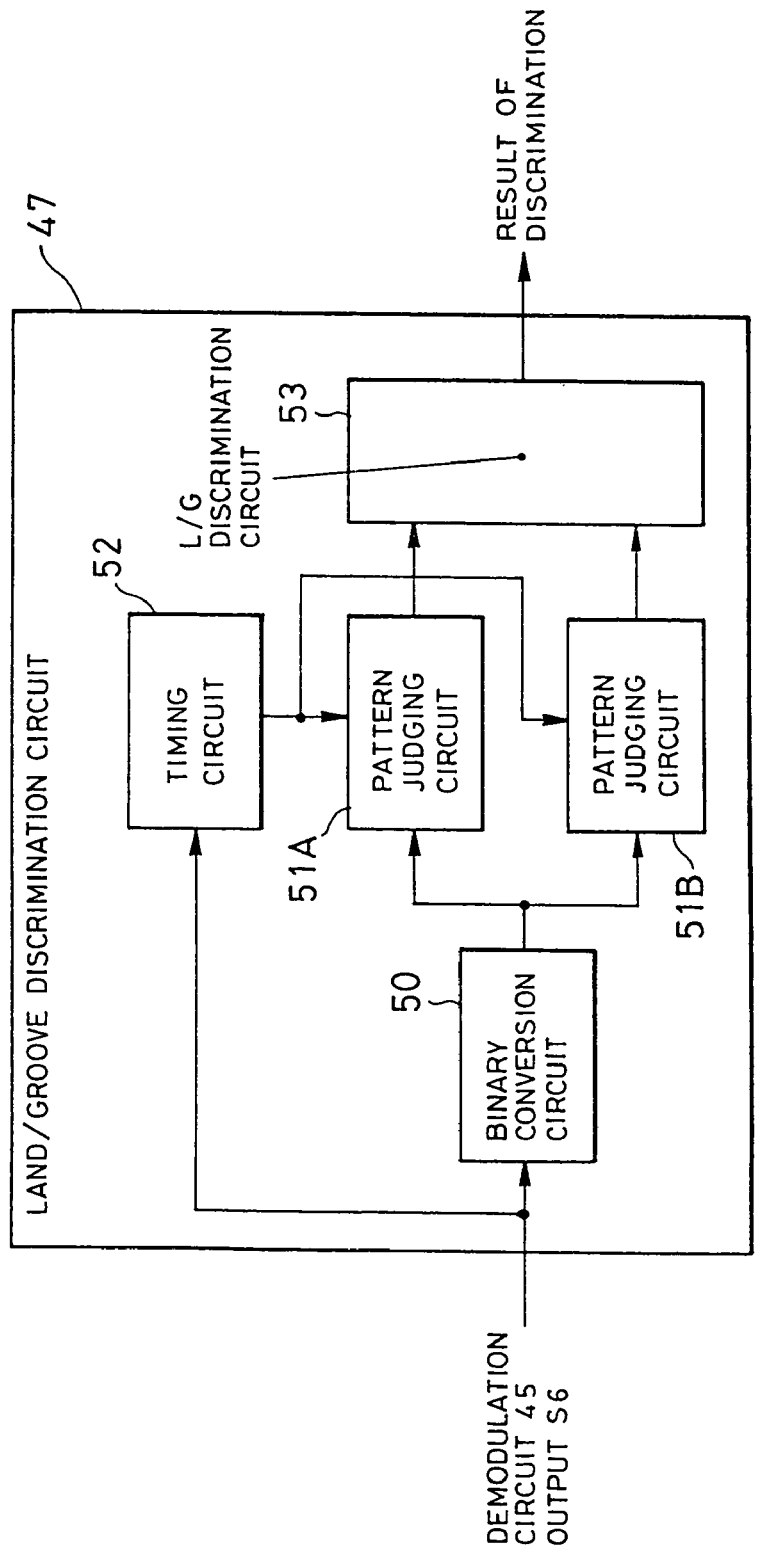
FIG. 12 is a block circuit diagram showing an embodiment of a land/groove discriminating circuit 44 used in the optical disc recording/reproduction apparatus shown in FIG. 10.

FIG. 12 shows an example of the land/groove discrimination circuit 47. The output S6 of the phase demodulation circuit 43 which has been input is converted to binary data consisting of "H" and "L" by a binary conversion circuit 50 (refer to FIGS. 11B, 11C) and is input to the pattern detection circuits 51A, 51B. The pattern detection circuits 51A, 51B comprise shift registers and various gate circuits, and determine whether the data which has been taken in agrees with the synchronization pattern "01110001" which is identical with the synchronization signal S2 described above or a bit pattern "10001110" which is an inversion of the former, at the timing of taking in the synchronization signal according to the sync gate signal which is output from a timing circuit 52.

An L/G discrimination circuit 53 controls the polarity inversion circuit 38 based on the result outputs of the pattern detection circuits 51A, 51B and, when the outputs of the pattern detection circuits 51A and 51B indicate agreement ("H") and disagreement ("L"), respectively, it is judged that the laser beam 32 is tracing the groove 72 thereby controlling the polarity inversion circuit 38 to pass the signal (through state). In this case, the laser beam 32 is servo-controlled by the tracking control circuit 37 to track the groove 72. As the disc rotates so that the outputs of the pattern detection circuits 51A and 51B indicate disagreement ("L") and agreement ("H"), respectively, it is judged that the laser beam 32 has entered the status of tracing the land 73, thereby controlling the polarity inversion circuit 38 to invert the signal. In this case, the laser beam 32 is servo-controlled by the tracking control circuit 37 to track the land 73. In case the outputs of the pattern detection circuits 51A and 51B are in a combination other than the above for some reason, the L/G discrimination circuit 53 leaves the polarity inversion circuit 38 as it is, namely does not control it.

At a time of transition when the tracing by the laser beam 32 moves from the groove 72 to the land 73, or from the land 73 to the groove 72 as the disc rotates, there occurs such a time interval as the polarity of the tracking servo signal is inverted. However, since the tracking servo system is unable to respond during this interval, the laser beam will never be displaced to the adjacent land or track.

The present invention is not limited to the embodiment described above, and it will be apparent that the invention may be embodied in various other forms without deviating from the scopes set forth in claims of this patent application. For example, the master optical disc recording apparatus described above makes a master disc for single spiral discs, but may also be adapted to make a master optical disc for writing recorded/reproduced data either on the lands or on the grooves only. It naturally follows that the invention is not limited to the configuration of wobbling the wall surface only on one side of the groove.

Also in the apparatus of the embodiment described above, the output level of the phase modulation signal is held at the maximum positive or maximum negative level during an interval of T/2 (T is the basic period) including the phase transition point p at the center thereof, in order to prevent the groove from making an abrupt change in the wobbling curve, but the invention is not limited to this configuration.

In particular, while such a configuration as shown in FIG. 6 is employed where sampling data of the basic waveforms W1 through W8 corresponding to the value of consecutive 3-bit data of the channel bit signal S3 is stored in the memory and the sampling data read from the memory is converted into analog data thereby generating the phase modulation signal, but the invention is not limited to this circuit configuration. For example, output level of the phase modulation signal may be held by an S/H circuit during an interval of T/2 including the phase transition point at the center thereof.

Figure 13:
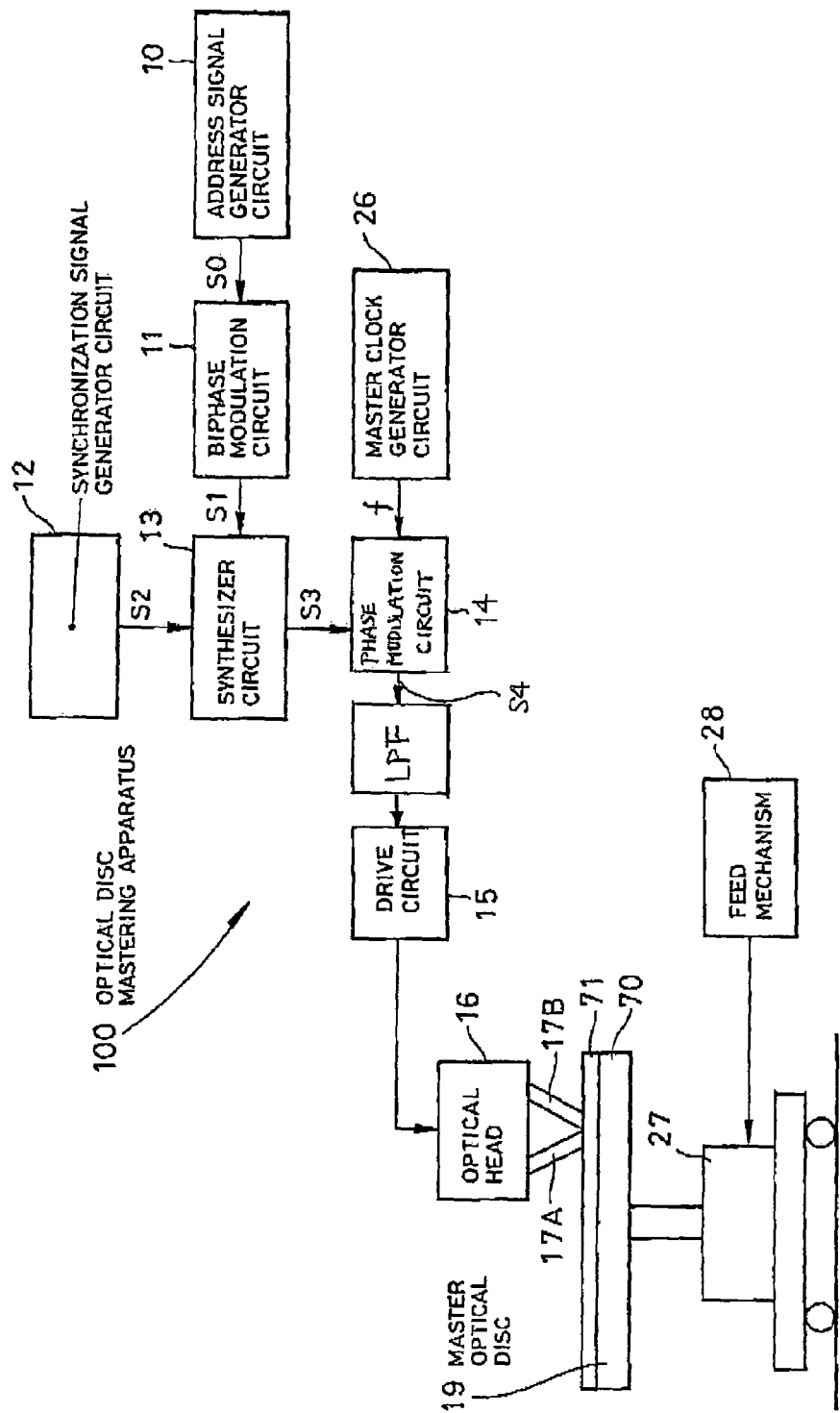
FIG. 13 is a block diagram of another embodiment of the optical disc recording apparatus according to the present invention.

Alternatively, instead of holding the output level of the phase modulation signal, such a configuration may also be employed that the channel bit signal S3 is phase-modulated by a known phase modulation circuit as described in Japanese Patent Kokai No. Hei 10-320773, with the phase modulation signal being fed to a low-pass filter as illustrated in FIG. 13, thereby generating a phase modulation signal having a waveform of which abrupt changes at phase transition points have been removed.

According to an aspect of the invention, such an optical disc can be provided that has stable performance maintained over a long period of time and high immunity to deterioration in the C/N ratio and allows it to reliably read the address information recorded thereon. Further, it is made possible to determine whether land is reproduced or groove is reproduced by means of groove reproduction signal.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An optical disc being pre-formatted with serial data by means of wobbling groove, said serial data including address information, wherein said groove is made wobble in accordance with a phase modulation signal of said serial data, said phase modulation signal having a substantially constant level in a predetermined period centered at each of phase transition points so that abrupt changes in the waveform thereof at the phase transition points are removed.

2. An optical disc as claimed in claim 1, wherein said predetermined period is a half of a base period of the phase modulation signal.

3. An optical disc whereon a wall surface on one side of a groove wobble in accordance with serial data including address information, wherein:
said serial data includes a synchronization signal having a predetermined pattern for discriminating a land and the groove; and
said groove is made wobble in accordance with phase modulation signal of said serial data including said synchronization signal, said phase modulation signal having a substantially constant level in a predetermined period centered at each of phase transition points so that abrupt changes in the waveform thereof at the phase transition points are removed.

4. An optical disc as claimed in claim 3, wherein said predetermined period is a half of a base period of the phase modulation signal.

5. An optical disc being pre-formatted with serial data by means of wobbling groove, said serial data including address information, wherein said groove is made wobble in accordance with a phase modulation signal of said serial data, said phase modulation signal being low-pass filtered so that abrupt changes in the waveform thereof at phase transition points are removed.

6. An optical disc whereon a wall surface on one side of a groove wobble in accordance with serial data including address information, wherein:
said serial data includes a synchronization signal having a predetermined pattern for discriminating a land and the groove; and
said groove is made wobble in accordance with a phase modulation signal of said serial data including said synchronization signal, said phase modulation signal being low-pass filtered so that abrupt changes in the waveform thereof at phase transition points are removed.

7. An optical disc recording apparatus for pre-formatting an optical disc by having a groove of the optical disc wobble in accordance with serial data including address information, comprising:
a phase modulation circuit for generating a phase modulation signal in accordance with said serial data, said phase modulation signal having a substantially constant level in a predetermined period centered at each of phase transition points so that abrupt changes in the waveform thereof at the phase transition points are removed; and
groove wobbling means for making said groove wobble in accordance with said phase modulation signal.

8. An optical disc recording apparatus according to claim 7, wherein said phase modulation circuit comprises a memory for storing data of a plurality of basic waveforms constituting said phase modulation signal, a memory control circuit for reading data of one of said plurality of basic waveforms in accordance with the serial data, and a D/A converter circuit for converting the basic waveform data read from the memory to analog data.

9. An optical disc recording apparatus as claimed in claim 7, wherein said predetermined period is a half of a base period of the phase modulation signal.

10. An optical disc recording apparatus for pre-formatting an optical disc by having a wall surface on one side of a groove of the optical disc wobble in accordance with serial data including address information, said apparatus comprising:
a synthesizer circuit for synthesizing a synchronization signal having a predetermined pattern for discriminating a land and the groove, with said serial data;
a phase modulation circuit for modulating output of said synthesizer circuit into a phase modulation signal, said phase modulation signal having a substantially constant level in a predetermined period centered at each of phase transition points so that abrupt changes in the waveform thereof at the phase transition points are removed; and
groove wobbling means for making the wall surface on one side of said groove wobble in accordance with said phase modulation signal.

11. An optical disc recording apparatus as claimed in claim 10, wherein said predetermined period is a half of a base period of the phase modulation signal.

12. An optical disc recording apparatus for pre-formatting an optical disc by having a groove of the optical disc wobble in accordance with serial data including address information, comprising:
a phase modulation circuit for generating a phase modulation signal in accordance with said serial data;
a low-pass filter for low-pass filtering said phase modulation signal so that abrupt changes in the waveform thereof at phase transition points are removed; and
groove wobbling means for making said groove wobble in accordance with said phase modulation signal passed through said low-pass filter.

13. An optical disc recording apparatus for pre-formatting an optical disc by having a wall surface on one side of a groove of the optical disc wobble in accordance with serial data including address information, said apparatus comprising:
a synthesizer circuit for synthesizing a synchronization signal having a predetermined pattern for discriminating a land and the groove, with said serial data;
a phase modulation circuit for modulating output of said synthesizer circuit into a phase modulation signal;
a low-pass filter for low-pass filtering said phase modulation signal so that abrupt changes in the waveform thereof at phase transition points are removed; and
groove wobbling means for making the wall surface on one side of said groove wobble in accordance with said phase modulation signal.

14. An optical disc recording method comprising the step of having a groove of an optical disc wobble in accordance with a phase modulation signal obtained through phase modulation of serial data including address information to pre-format the optical disc,
said method comprising a step of generating the phase modulation signal in accordance with said serial data, said phase modulation signal having a substantially constant level in a predetermined period centered at each of phase transition points so that abrupt changes in the waveform thereof at the phase transition points are removed, and a step of making said groove wobble in accordance with said phase modulation signal.

15. An optical disc recording method according to claim 1, wherein data of a plurality of basic waveforms constituting said phase modulation signal is stored in a memory, data of one of said plurality of basic waveforms corresponding to the serial data is read from the memory, and the data of said basic waveform having been read is converted to analog data, thereby generating said phase modulation signal.

16. An optical disc recording method as claimed in claim 1, wherein said predetermined period is a half of a base period of the phase modulation signal.

17. An optical disc recording method comprising the step of having a wall surface on one side of a groove of an optical disc wobble in accordance with serial data including address information to pre-format the optical disc, wherein:

said serial data includes a synchronization signal having a predetermined pattern for detecting a land and the groove, while said serial data including the synchronization signal is modulated into a phase modulation signal, said phase modulation signal having a substantially constant level in a predetermined period centered at each of phase transition points so that abrupt changes in the waveform thereof at the phase transition points are removed, and the wall surface on one side of the groove is made wobble in accordance with said phase modulation signal.

18. An optical disc recording method as claimed in claim 17, wherein said predetermined period is a half of a base period of the phase modulation signal.

19. An optical disc recording method comprising the step of having a groove of an optical disc wobble in accordance with a phase modulation signal obtained through phase modulation of serial data including address information to pre-format the optical disc, said method further comprising the steps of generating the phase modulation signal in accordance with said serial data, low-pass filtering said phase modulation signal so that abrupt changes in the waveform thereof at phase transition points are removed, and making said groove wobble in accordance with said phase modulation signal.

20. An optical disc recording method comprising the step of having a wall surface on one side of a groove of an optical disc wobble in accordance with serial data including address information to pre-format the optical disc, wherein:

said serial data includes a synchronization signal having a predetermined pattern for detecting a land and the groove, while said serial data including the synchronization signal is modulated into a phase modulation signal, said phase modulation signal being low-pass filtered so that abrupt changes in the waveform thereof at phase transition points are removed, and the wall surface on one side of the groove is made wobble in accordance with said phase modulation signal.

* * * * *